US011259990B2

(12) United States Patent
Beader et al.

(10) Patent No.: US 11,259,990 B2
(45) Date of Patent: Mar. 1, 2022

(54) RECYCLED TWO CELL CONTAINER DEVICE AND METHODS OF MANUFACTURING A RECYCLED TWO CELL CONTAINER DEVICE

(71) Applicants: Howard Beader, Beverly, MA (US); Lori Bovarnick, Beverly, MA (US)

(72) Inventors: Howard Beader, Beverly, MA (US); Lori Bovarnick, Beverly, MA (US)

(73) Assignee: MOTHER CONCEPTS INC., Beverly, MA (US)

( * ) Notice: Subject to any disclaimer, the term of this patent is extended or adjusted under 35 U.S.C. 154(b) by 0 days.

(21) Appl. No.: 16/842,006

(22) Filed: Apr. 7, 2020

(65) Prior Publication Data
US 2021/0007929 A1    Jan. 14, 2021

Related U.S. Application Data

(60) Provisional application No. 62/872,784, filed on Jul. 11, 2019.

(51) Int. Cl.
| | | |
|---|---|---|
| *A61J 1/03* | (2006.01) | |
| *A61J 7/00* | (2006.01) | |
| *B29D 22/00* | (2006.01) | |

(52) U.S. Cl.
CPC .............. *A61J 1/035* (2013.01); *A61J 7/0015* (2013.01); *B29D 22/003* (2013.01)

(58) Field of Classification Search
CPC . A61J 1/035; A61J 7/0015; A61J 1/03; B65D 21/02; B65D 21/0233
USPC ............ 206/528, 538, 531; 220/23.87, 23.83
See application file for complete search history.

(56) References Cited

U.S. PATENT DOCUMENTS

| | | | |
|---|---|---|---|
| 3,797,658 A * | 3/1974 | Peacock ................ | B65D 23/12 206/484 |
| 4,324,338 A | 4/1982 | Beall | |
| 5,065,875 A | 11/1991 | Balavich | |
| 5,318,787 A * | 6/1994 | Brauner ............. | B65D 21/0238 206/216 |
| 5,447,236 A | 9/1995 | Perry et al. | |
| 5,782,359 A | 7/1998 | McAllister et al. | |
| 6,068,865 A | 5/2000 | Lee et al. | |
| 6,419,081 B1 | 7/2002 | Ross | |
| 6,488,146 B1 | 12/2002 | Dotsikas | |

(Continued)

OTHER PUBLICATIONS

PCT/US20/40215, International Search Report, dated Sep. 15, 2020.
https://www.aliexpress.com/item/33017289584.html?spm=2114.search0303.3.381.2aa76553E10431&ws_ab_test=searchweb0_0.

*Primary Examiner* — Steven A. Reynolds
(74) *Attorney, Agent, or Firm* — Caldwell Intellectual Property Law, LLC

(57) ABSTRACT

A two cell container device the device includes a first housing and configured to house a liquid, the first housing including a body, wherein the body further comprises an annular form with an interior reservoir for the liquid and a central through-hole and a mouth portion providing access to the interior receptacle. The two cell container device includes a second housing, the second housing secured within the through-hole, the second housing configured to house at least a pill, wherein the second housing includes a first side including at least a pill receptacle having an opening and a second side adhered to the first side, wherein the second side covers the opening.

18 Claims, 9 Drawing Sheets

(56) References Cited

U.S. PATENT DOCUMENTS

| | | |
|---|---|---|
| 6,488,169 B1 | 12/2002 | Magnusson et al. |
| 6,913,777 B2 | 7/2005 | Rebhorn et al. |
| 7,487,881 B2 | 2/2009 | Watzke et al. |
| 8,087,526 B2 | 1/2012 | Dovey et al. |
| 8,550,240 B2 | 10/2013 | Marcus et al. |
| 9,199,779 B2 | 12/2015 | Zoss et al. |
| 9,492,024 B2 | 11/2016 | Sorensen et al. |
| 9,856,053 B2 | 1/2018 | Pisarevsky |
| 2002/0192338 A1 | 12/2002 | Ness et al. |
| 2007/0026112 A1 | 3/2007 | Zimmerman et al. |
| 2008/0000786 A1 | 1/2008 | Collotta et al. |
| 2008/0035521 A1 | 2/2008 | Takizawa et al. |
| 2008/0296181 A1 | 12/2008 | Stephens |
| 2010/0181275 A1 | 7/2010 | Gruenwald et al. |
| 2011/0062043 A1 | 3/2011 | Bougoulas et al. |
| 2011/0286782 A1 | 11/2011 | Castellani |
| 2012/0302948 A1 | 11/2012 | Nassiri et al. |
| 2014/0360966 A1 | 12/2014 | Howard |
| 2015/0005702 A1* | 1/2015 | Soper ................ B65D 51/2807 604/78 |
| 2015/0041351 A1 | 3/2015 | Laibe |
| 2017/0114205 A1 | 4/2017 | Maille |
| 2018/0344575 A1* | 12/2018 | Brady ................... A61J 7/0084 |
| 2018/0354682 A1 | 12/2018 | Perez |

\* cited by examiner

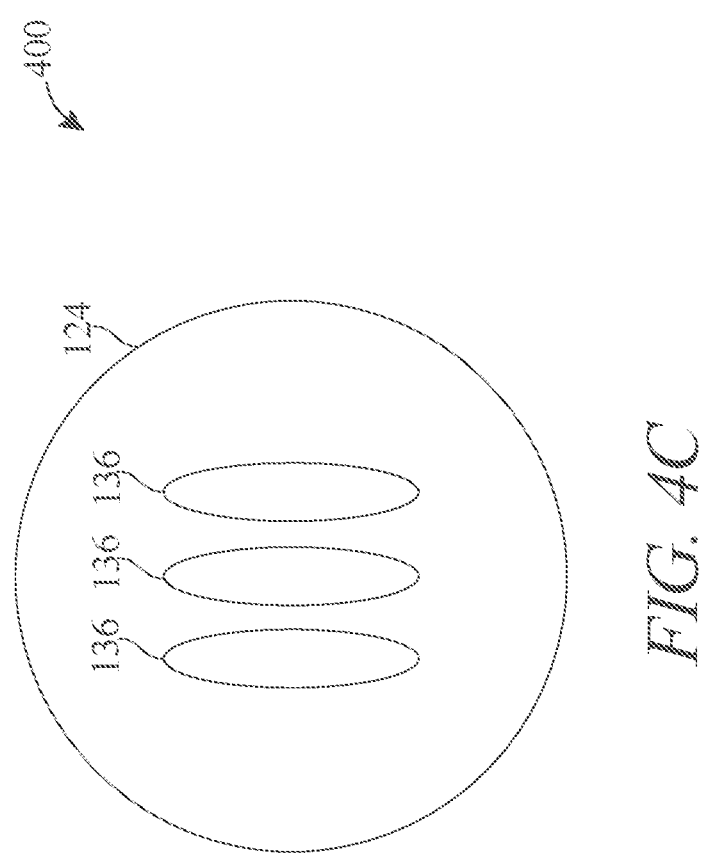

RECYCLED TWO CELL CONTAINER DEVICE AND METHODS OF MANUFACTURING A RECYCLED TWO CELL CONTAINER DEVICE

CROSS-REFERENCE TO RELATED APPLICATIONS

This application claims the benefit of priority of U.S. Provisional Patent Application Ser. No. 62/872,784, filed on Jul. 11, 2019, and titled "RECYCLED TWO CELL CONTAINER DEVICE AND METHODS OF MANUFACTURING A RECYCLED TWO CELL CONTAINER DEVICE," which is incorporated by reference herein in its entirety.

FIELD OF THE INVENTION

The present invention generally relates to the field of pill containers. In particular, the present invention is directed to a recycled two cell container device and methods of manufacturing a recycled two cell container device.

BACKGROUND

Presently, over one million plastic water containers are thrown away each minute of the day. Discarded plastic containers pollute oceans and create unnecessary waste. Looking ahead, reusing discarded plastic containers is of utmost importance to protect future generations from superfluous pollution.

SUMMARY OF THE DISCLOSURE

In an aspect, a two cell container device the device includes a first housing and configured to house a liquid, the first housing including a body, wherein the body further comprises an annular form with an interior reservoir for the liquid and a central through-hole and a mouth portion providing access to the interior receptacle. The two cell container device includes a second housing, the second housing secured within the through-hole, the second housing configured to house at least a pill, wherein the second housing includes a first side including at least a pill receptacle having an opening and a second side adhered to the first side, wherein the second side covers the opening.

In another aspect, a method of manufacturing a recycled two cell container device includes providing a first housing, the first housing configured to house a liquid, the first housing including a body, wherein the body further comprises an annular form with an interior reservoir for the liquid and a central through-hole and a mouth portion providing access to the interior receptacle. The method includes providing a second housing configured to house at least a pill, wherein the second housing includes a first side including at least a pill receptacle having an opening and a second side adhered to the first side, wherein the second side covers the opening. The method includes securing the second housing within the through-hole.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 4A-4C are schematic drawings illustrating exemplary embodiments of grooves located on second housing;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a recycled two cell container device and methods of manufacturing a recycled two cell container device. In an embodiment, a recycled two cell container device includes a first housing and a second housing. The first housing is configured to house a liquid and the second housing is configured to house at least a pill. A recycled two cell container device is configured for compact and easy transport. In an embodiment, a recycled two cell container device is disposable after use. In an embodiment, a recycled two cell container device is reusable after use.

Figure 1:
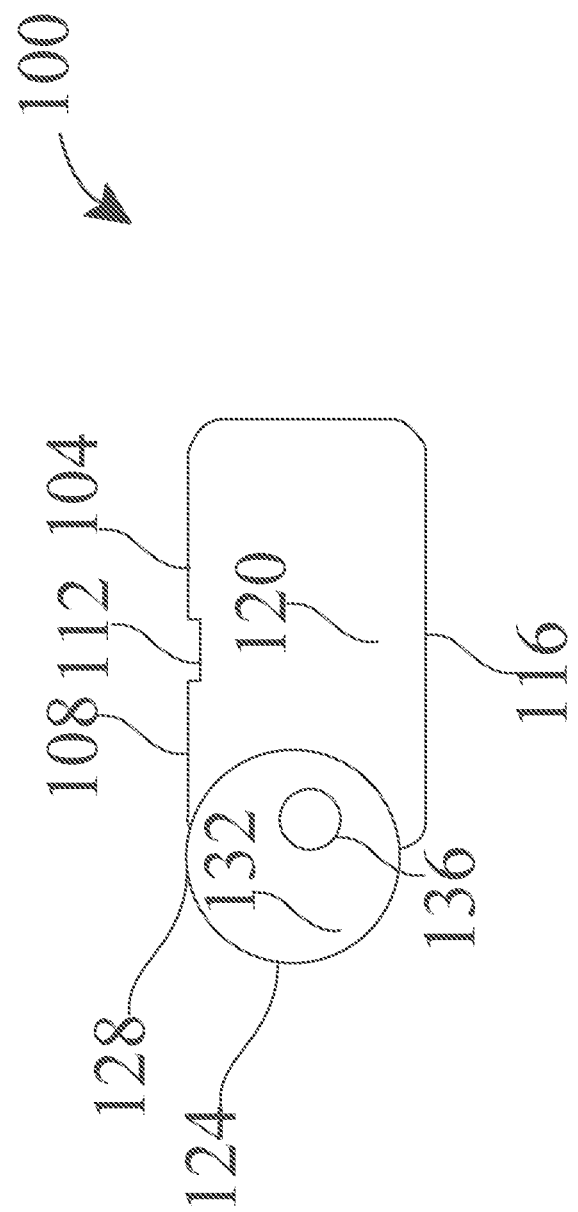
FIG. 1 is a schematic drawing illustrating an exemplary embodiment of a recycled two cell container device.

Referring now to the drawings, FIG. 1 illustrates an exemplary embodiment of a recycled two cell container device. Device 100 may be composed of recycled pharmaceutical grade materials such as recycled plastic from discarded water bottles. In an embodiment, device 100 may be configured for one-time single use. In such an instance, device 100 may be disposed of after use. Device 100 that is configured for one-time use may be able to be recycled after use. Device 100 that is configured for one-time use may be biodegradable. Biodegradable may include ability for device 100 to be broken down into innocuous products by the action of living things such as microorganisms and fungi. In an embodiment, one time use of device 100 may allow for device 100 to be disposed of in garbage or trash can after use by a user.

With continued reference to FIG. 1, device 100 may be configured for multi-use. In an embodiment, device 100 may be reused after use and refilled by a user as described in more detail below.

Device 100 includes a first housing 104, which may be composed of recycled material and configured to house a liquid. Recycled material, as used herein, includes any raw and/or processed material that can be recovered from a waste stream for reuse. For example, recycled material may be produced from the process of recycling, whereby materials are broken down and reused that would otherwise be discarded. Recycling may include the process of converting waste materials into reusable objects and/or reusable materials to prevent waste of potentially useful materials and prevent water pollution from landfills. Raw and/or processed material may include materials such as papers, plastics, glass, metals, organics, textiles, and any combination thereof. Waste stream includes the entire life cycle of the garbage that is produced by human beings and animals. For example, waste stream may include the act of bringing garbage out to the curb, placing recycled materials in a recycled bin, as well as the placement of garbage in a landfill. Recycled material may include for example aluminum cans, polyethylene terephthalate (PET) plastic bottles, newspapers, corrugated cardboard, steel cans, high density polyethylene (HDPE) plastic bottles, polyvinyl chloride (PVC) plastic bottles, polycarbonate plastic bottles, glass containers, computers, magazines, low density polyethylene (LDPE), polypropylene (PP), polystyrene (PS), polycarbonate, bisphenol A (BPA), sheet grade polycarbonate, acrylic sheet, aluminum foil, tin cans, office paper, poster board, flint glass, amber glass, emerald glass and the like. Recycled materials may be sourced from a plurality of sources such as plastic bottles that are recovered from the ocean or landfills and are then broken down to be used as a component of device 100. In an embodiment, first housing 104 may be composed of recycled material such as plastic, including any of the plastic as described above. In an embodiment, first housing 104 may be composed of 100% recycled pharmaceutical grade materials sourced from plastic bottles such as plastic water bottles that are discarded every day.

With continued reference to FIG. 1, first housing 104 is configured to house a liquid. Liquid, as used herein, includes any substance that flows freely but is of constant volume. Liquid may include any substance that a user may consume during the act of swallowing a pill. For example, liquid may include water that a user swallows when user swallows acetaminophen. Liquid may include other substances including for example, water, coconut water, oxygenated water, mineral water, water containing electrolytes, soft drinks such as carbonated beverages including soda, seltzer, and sparkling water, fruit juice such as orange, apple, grapefruit, pineapple, grape, tangerine, cranberry, pomegranate, lemon and lime, vegetable juice such as carrot, tomato, cucumber, and celery, energy drinks, electrolyte replacement drinks, and caffeinated beverages such as iced tea. First housing 104 may be configured to hold a particular volume of liquid. In an embodiment, first housing 104 may be configured to hold a volume of between 0 and 90 milliliters. For example, first housing 104 may be configured to hold a volume of liquid that would allow device 100 to be taken through airport security because first housing 104 may hold less than three ounces of liquid. In yet another non-limiting example, first housing 104 may be configured to hold a volume of 30 milliliters whereby device 100 may be easily transported in a user's pocket or bag for example. First housing 104 may be of a certain shape and size designed to house a liquid. In an embodiment, first housing 104 may be of a rectangular shape whereby liquid may conform to the shape of first housing 104 once placed inside first housing 104. In an embodiment, first housing 104 may be of a circular shape whereby liquid may conform to a circular shape once placed inside first housing 104. In an embodiment, first housing 104 may be of a square shape whereby liquid may conform to a square shape once placed inside first housing 104.

With continued reference to FIG. 1, first housing 104 includes an upper end 108, the upper end 108 containing at least a covering. At least a covering as used herein, includes a lid and/or cap that seals off first housing 104 from exposure to environmental air. At least a covering may include for example, a fitted and/or attached part that serves as a lid to first housing 104. In an embodiment, at least a covering may be synthesized from recycled material, including any of the recycled materials as described above. In an embodiment, at least a covering may be disposable. Disposable, as used herein, includes a one-time use covering that is intended to be discarded after removal from first housing 104. For example, a disposable covering may be a covering that is torn off and discarded after removal such as a piece of recycled aluminum foil or recycled plastic. In an embodiment, at least a covering may be reusable. Reusable, as used herein, includes a multi-use covering that is intended to be reused after use. For example, reusable covering may allow for a user to refill first housing 104 after a user has consumed liquid contained within first housing 104. At least a covering may include additional aspects and/or features that may allow for covering to be attached to first housing 104. For example, at least a covering may be attached to first housing 104 by a mechanical hinge. Mechanical hinge may include a mechanical bearing that may connect covering to first housing 104 that may allow for a limited angle of rotation between a covering and first housing 104. Mechanical hinge may include for example, a living hinge, spring hinge, barrel hinge, pivot hinge, butt/mortise hinge, case hinge, continuous hinge, concealed hinge, flag hinge, strap hinge and the like. At least a covering may include a screw covering that may be mechanically screwed on or off by a user to gain access to first housing 104. At least a covering may include a flip top that may be mechanically flipped to open to gain access to first housing 104 and flipped back to close and seal off access to first housing 104. At least a covering may include a snap top that may be mechanically snapped open or closed to gain access to first housing 104. At least a covering may include a crown cap that may be crimped into a locking position around first housing 104. At least a covering may include a snap on covering that may be opened by prying off covering, breaking off covering, and/or having a built-in dispenser contained within covering. At least a covering may include a friction fit covering that may require force to open and close covering. At least a covering may include a tamper-evident covering that may be used in detecting tampering with and unwanted access to first housing 104. At least a covering may include a dispensing feature such as a pour sprout, measuring attachment, sifting device, and/or actuator that may dispense a specific amount of liquid contained within first housing 104. At least a covering may include a rubber stop. At least a covering may include a recycled bottle stopper. At least a covering may include seal proof technology that may prevent liquid contained within first housing 104 from spilling and/or leaking out. At least a covering may include an interior surface and an exterior surface. Interior surface of at least a covering may seal off interior space of first housing from environmental air and exterior surface of at least a covering may interface with environmental air.

With continued reference to FIG. 1, at least a covering contained within upper end 108 of first housing 104 may include a mounting feature. Mounting feature, as used herein, includes any feature that aids a first device 100 in attaching to a second device 100. In an embodiment, mounting feature may be located on exterior surface of covering that is exposed and interfaces with environment air. In an embodiment, mounting feature may be located on exterior surface of at least a covering. In an embodiment, mounting feature may be located along outer border and/or edge of first housing 104. Mounting feature may include for example, a feature that allows a plurality of devices 100 to be attached together as a multi-pack. For example, a user may purchase a multi-pack of devices 100 containing three individual devices 100 that are attached together by mounting feature. In an embodiment, mounting feature may be composed of recycled material, including any of the recycled material as described above. Mounting feature may include for example, a snap joint, whereby at least a covering may contain a protrusion that is designed to fit within an aperture located on second device 100. Mounting feature may include a clip that may attach to other devices. Formation of a mounting feature may include welding a first device 100 to a second device 100 such as by applying heat to the edges of first housing 104 so as to blend the edges together and attach first device 100 to second device 100. In such an instance, first device 100 may be separated from second device 100 such as by snapping first device 100 apart from second device 100.

With continued reference to FIG. 1, first housing 104 may include a groove 112 located on upper end 108 designed to interface with a patient's lips. "Groove," as used herein, includes a depression or cutout. In an embodiment, groove 112 may be located on upper end 108 of first housing 104. Groove 112 may be of a certain size and shape so as to interface with a patient's lips and allow for easier consumption of liquid contained within first housing 104. In an embodiment, groove 112 may be configured to interface with a patient's upper lip, whereby a patient may place patient's upper lip on groove 112 so as to provide a resting spot for patient's lip while patient swallows liquid contained within first housing 104. In an embodiment, groove 112 may be of a certain size and shape so as to interface with a lip of average size of an adult. In an embodiment, groove 112 may be of a certain size and shape so as to interface with a lip of average size of a child. Groove 112 is illustrated in more detail below in reference to FIG. 3.

With continued reference to FIG. 1, first housing 104 may be positioned within device 100 whereby first housing 104 is in a juxtaposed position located below second housing. Juxtaposed, as used herein, includes a position whereby first housing 104 is located side by side to second housing. Side by side may include a position whereby first housing 104 is located next to and/or in contact with second housing.

With continued reference to FIG. 1, first housing 104 includes a body 116. Body 116 may be composed of recycled materials including any of the recycled materials as described above. First housing 104 includes a lower end 120, the lower end 120 located opposite to the upper end 108.

With continued reference to FIG. 1, device 100 includes a second housing 124 composed of recycled material. Recycled material may include any of the recycled material as described above. In an embodiment, second housing 124 may be composed of 100% recycled pharmaceutical grade materials sourced from plastic bottles such as plastic water bottles that are discarded every day. In an embodiment, second housing 124 may be composed of the same materials as first housing 104. Second housing 124 may be of a particular size and shape to house at least a pill. In an embodiment, second housing 124 may be of a rectangular shape. In an embodiment, second housing 124 may be of a circular shape. In an embodiment, second housing 124 may be of a square shape.

With continued reference to FIG. 1, second housing 124 is attached to first housing 104 and is configured to house at least a pill. Second housing 124 may be attached to first housing 104 whereby first housing 104 may be joined, fastened, and/or connected to second housing 124. In an embodiment, first housing 104 and second housing 124 may be composed of one continuous material. In an embodiment, first housing 104 and second housing 124 may be composed of different materials. In an embodiment, first housing 104 and second housing 124 may be attached together in juxtaposed position so as to form one continuous device. In an embodiment, first housing 104 may be located below second housing 124 so as to prevent liquid contained within first housing 104 from spilling into second housing 124. In an embodiment, second housing 124 may be attached to first housing 104 by at least a protrusion extending from a second housing 124 wherein the at least a protrusion is designed and configured to interface with at least a depression located on a first housing 104. In an embodiment, protrusion may be composed of recycled material including any of the recycled material as described above. In an embodiment, protrusion may be of a certain size and shape designed and configured to fit within depression. Depression may include a cutout that is designed to interface with protrusion and may be of a similar size and shape of depression. In an embodiment, protrusion may include extensions and/or claw like edges that may function to encompass depression and provide a tight interface. In an embodiment, second housing 124 may be attached to first housing 104 by a snapping feature. Snapping feature may include a locking fit mechanism that attaches second housing 124 to first housing 104.

With continued reference to FIG. 1, second housing 124 includes a first side 128, the first side 128 including at least a covering. At least a covering may include any of the coverings as described above in reference to first housing 104. In an embodiment, at least a covering may include a disposable covering including any of the disposable coverings as described above in reference to first housing 104. For example, second housing 124 may be preloaded and sold to a user containing a specific dose of medication such as two tablets each containing 200 mg of ibuprofen. In an embodiment, at least a covering located on second housing 124 may include a reusable covering include any of the reusable coverings as described above in reference to first housing 104. For example, at least a covering may be reusable whereby a user may reload second housing 124 with at least a pill after consumption. In such an instance, user may reload second housing 124 to contain at least a pill such as a daily prescription medication or a rescue medication user carries around for migraines or allergies or the like. At least a covering may include an interior surface and an exterior surface. Interior surface of at least a covering may seal off interior space of second housing from environmental air and exterior surface of at least a covering may interface with environmental air. In an embodiment, at least a covering located on first housing and second housing may be one continuous covering that allows access to first housing and second housing simultaneously once opened. In such an instance, at least a covering located on first housing and second housing may close access to first housing and second housing simultaneously once closed. First side may include a mounting feature located on at least a covering. Mounting feature may include any of the mounting features as described above in reference to first housing. In an embodiment, mounting feature may be located on exterior surface of at least a covering and interfacing with environmental air.

With continued reference to FIG. 1, second housing 124 is configured to house at least a pill. A pill, as used herein, includes any mass of solid medicine configured to be swallow whole. A pill may include a capsule, tablet, lozenge, orally disintegrating tablet, enteric coated tablet, troche, pellet, pilule, caplet, and the like. Medicine may include any prescription, non-prescription, over the counter, vitamin, drug, herbal, nutraceutical, homeopathic and the like. For example, at least a pill may include a dose of an over the counter pain medication such as a dose of TYLENOL as produced by Johnson and Johnson of New Brunswick, N.J. or a dose of ADVIL as produced by Pfizer of New York, N.Y. or a dose of ASPIRIN as produced by Bayer of Leverkusen, Germany or a dose of ALEVE as produced by Bayer of Leverkusen, Germany. In yet another non-limiting example, at least a pill may include a dose of an over the counter allergy medication such as ALLEGRA as produced by Sanofi of Paris, France or a dose of ZYRTEC as produced by Johnson and Johnson of New Brunswick, N.J. In yet another non-limiting example, at least a pill may include a dose of an over the counter heartburn medication such as PRILOSEC OTC as produced by Procter and Gamble of Cincinnati, Ohio or a dose of TUMS as produced by GlaxoSmithKline of Brentford, United Kingdom. In yet another non-limiting example, at least a pill may include a dose of an allergy medication such as BENADRYL as produced by Johnson and Johnson of New Brunswick, N.J. or a dose of CLARITIN as produced by Bayer of Leverkusen, Germany. In yet another non-limiting example, at least a pill may include a dose of a cold or flu medication such as DAYQUIL as produced by Procter and Gamble of Cincinnati, Ohio or a dose of NYQUIL as produced by Procter and Gamble of Cincinnati, Ohio. In yet another non-limiting example, at least a pill may include a dose of a vitamin such as a multivitamin, a calcium supplement, a vitamin b-complex, a probiotic, a digestive enzyme and the like. At least a pill may include a prescription medication such as a medication prescribed only by a medical professional with prescriptive authority such as a medical doctor, nurse practitioner, or physician assistant. At least a pill may include an herbal remedy such as COLDCALM as produced by Boiron Homeopathic of Sainte-Foy-les-Lyon, France.

With continued reference to FIG. 1, second housing 124 may include a body. Second housing 124 includes a second side 132 located opposite to the first side 128. In an embodiment, second side 132 may contain at least a groove 136 designed and configured to house at least a pill. Groove 136 includes a depression or cutout that may be of a certain size or shape designated to house at least a pill. In an embodiment, groove 136 may be of a certain size and shape to accommodate at least a pill of a certain size or shape. For example, groove 136 may be designed and configured to accommodate a size 3 capsule or an orally disintegrating tablet or a size 0 capsule. In an embodiment, second side 132 may contain a plurality of grooves such as when a dose of a medication may include a plurality of pills. For example, second side 132 may contain two grooves 136 each designed and configured to accommodate an ibuprofen 200 mg round tablet. In yet another non-limiting example, second side 132 may contain three grooves each designed and configured to accommodate a size 00 capsule. Groove 132 may aid in securing at least a pill so as to prevent damage to at least a pill during transport of device 100.

With continued reference to FIG. 1, device 100 may be configured for single use. Single use may include pre-loading device 100 with liquid contained in first housing 104 and at least a pill contained in second housing 124 before a user purchases device 100. After user consumes liquid and pill contained within device 100 then device 100 may be discarded such as by being recycled or thrown away in the garbage. For example, user may purchase single-use device at an airport when user has a headache and user is rushing to get onto user's flight. Device 100 may be configured for multi-use. Multi-use may allow device 100 to be reused. For example, user may purchase pre-loaded device 100 from a store and then reload first housing or second housing after use. In yet another non-limiting example, user may purchase device 100 that does not contain a liquid or pill and user may load device 100 with liquid and/or pill as user needs to.

Figure 2:
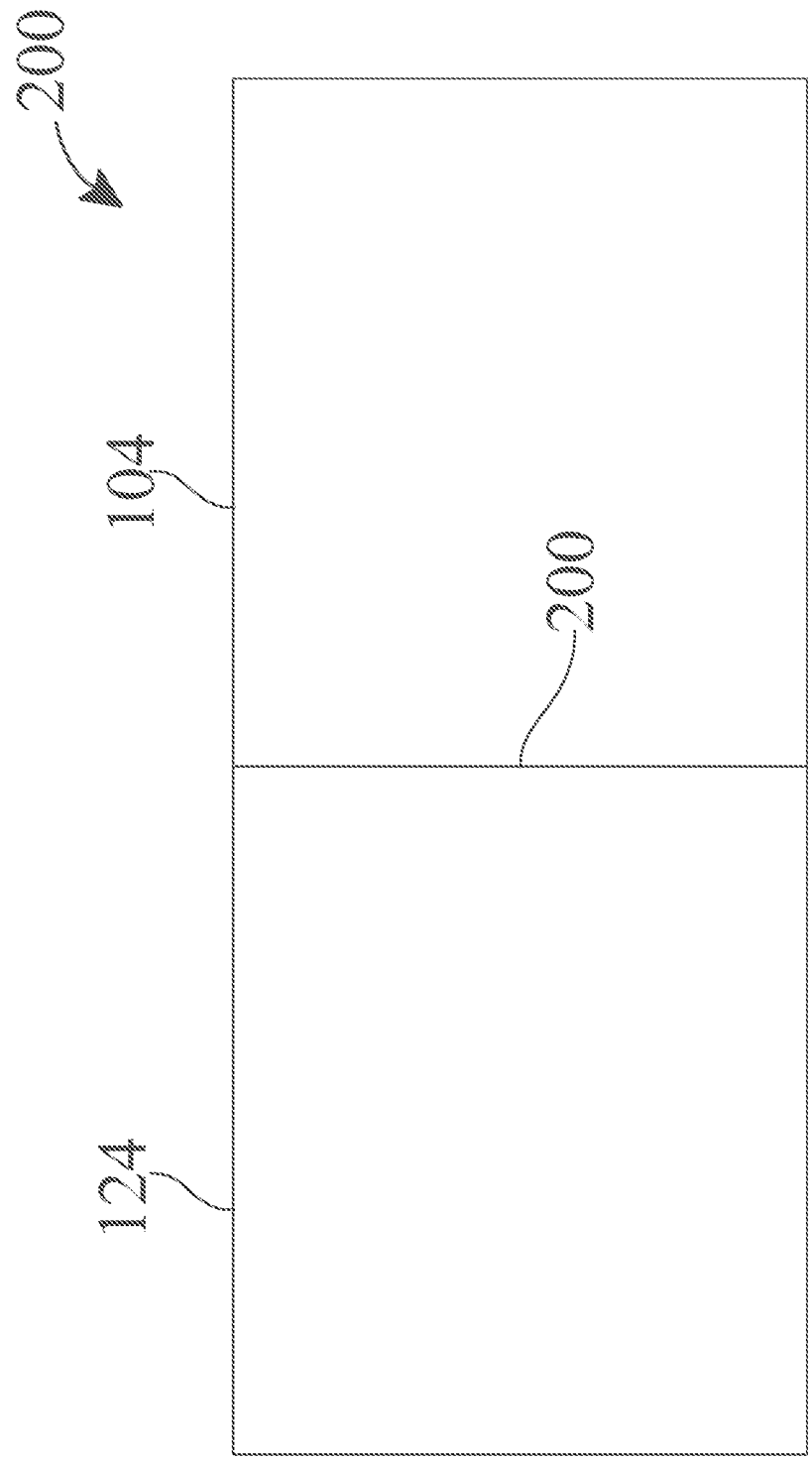
FIG. 2 is a schematic drawing illustrating an exemplary embodiment of a recycled two cell container device.

Referring now to FIG. 2, an exemplary embodiment of device 100 is illustrated. In an embodiment, first housing 104 may be of a rectangular shape and second housing 124 may be of a rectangular shape. First housing 104 and second housing 124 may be attached whereby first housing 104 may be in contact at point 200 with second housing 124. In an embodiment, first housing 104 may be attached to second housing 124 by a snapping feature as described above in more detail in reference to FIG. 1. In an embodiment, first housing 104 may be attached to second housing 124 by a protrusion extending from second housing 124 designed to interface with at least a depression located on first housing 104 as described above in more detail in reference to FIG. 1. In an alternative embodiment, first housing 104 may be of a circular shape and second housing 124 may be a circular shape. First housing 104 and second housing 124 may be attached at a point 300 whereby first housing 104 may be in contact with second housing 124. In an embodiment, first housing 104 may be attached to second housing 124 by a snapping feature as described above in more detail in reference to FIG. 1.

Figure 3:
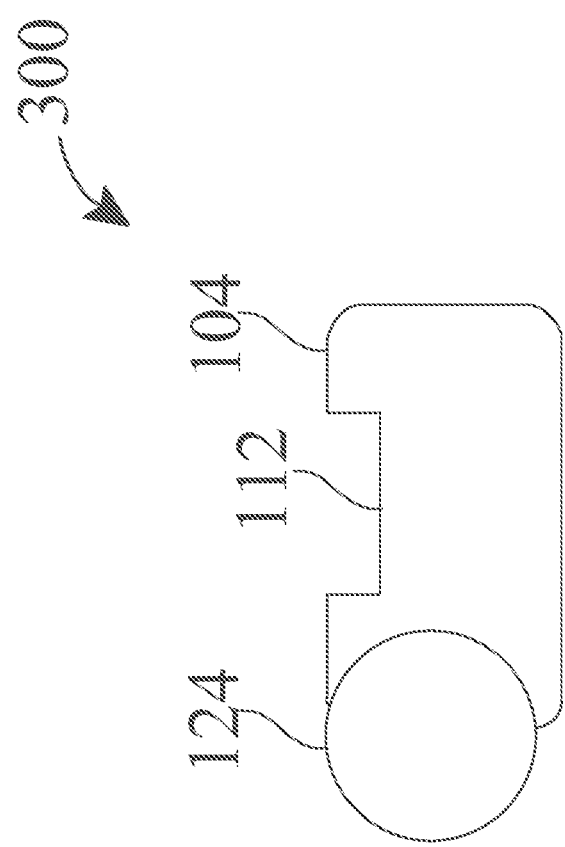
FIG. 3 is a schematic drawing illustrating an exemplary embodiment of a grove located on first housing.

Referring now to FIG. 3, an exemplary embodiment of groove 112 located on upper end 108 of first housing 104 is illustrated. In an embodiment, groove 112 may include a depression that is designed to interface with a patient's upper lip. Groove 112 may be of a certain size and shape. For example, in an embodiment groove 112 may be configured to interface with upper lip of an adult. In yet another non-limiting example, groove 112 may be configured to interface with upper lip of a child. Groove 112 may aid a user in swallowing at least a pill by providing a place for user to rest user's upper lip so as to not spill any liquid contained within first housing 104.

Figure 4A:
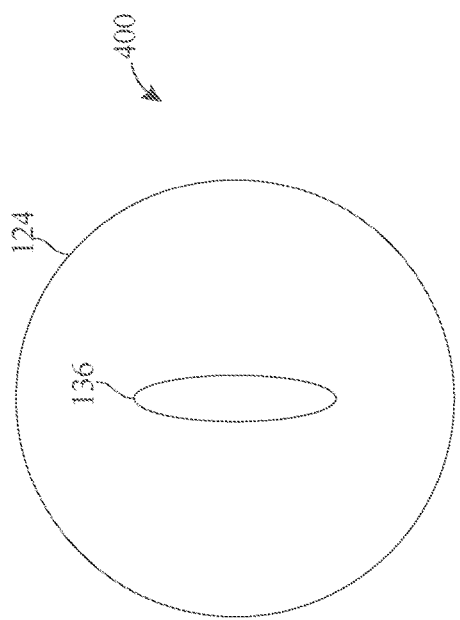
Figure 4B:
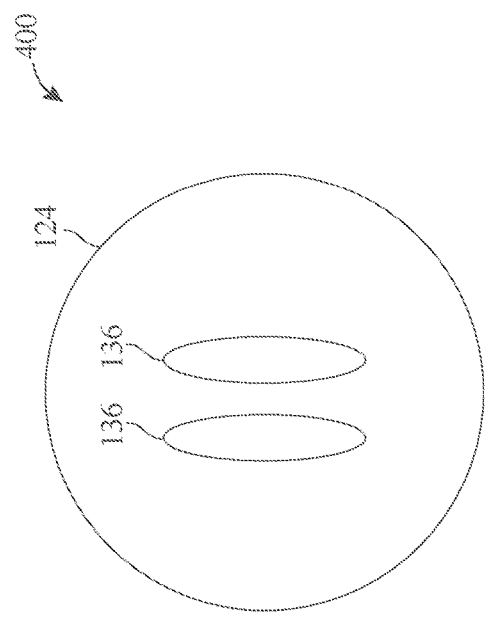

Referring now to FIGS. 4A-C exemplary embodiments of groove 136 designed and configured to house at least a pill located on second side of second housing 124 is illustrated. FIG. 4A illustrates an exemplary embodiment where a single groove 136 configured to house one pill is illustrated. In an embodiment, groove 136 may be configured to house pills of varying sizes as described above in more detail in reference to FIG. 1. Groove 136 may function to secure pill in place so that pill does not become damaged while contained within device 100. For example, device 100 may be transported in a user's backpack or purse and may be subjected to bumping, shaking, and twisting. Groove 136 may aid in containing pill securely against second side of second housing 124. FIG. 4B illustrates an exemplary embodiment where two grooves 136 are contained within second housing 124 each configured to house one pill. Such a configuration may be useful when dose of at least a pill is contained within two pills such as two 25 mg diphenhydramine tablets that a user may consume as one dose or two 400 mg acetaminophen tablets that user may consume as one dose. In yet another non-limiting example, two grooves 136 contained within second housing 124 may be used to store two pills whereby one pill may be consumed at one point in time and a second pill may be consumed at a later point in time such as if user needs a second dose later on. FIG. 4C illustrates an exemplary embodiment where three grooves 136 are contained within second housing 124 each configured to house one pill. In an embodiment, user ay be able to customize size and number of grooves 136 contained within second housing 124.

Figure 5:
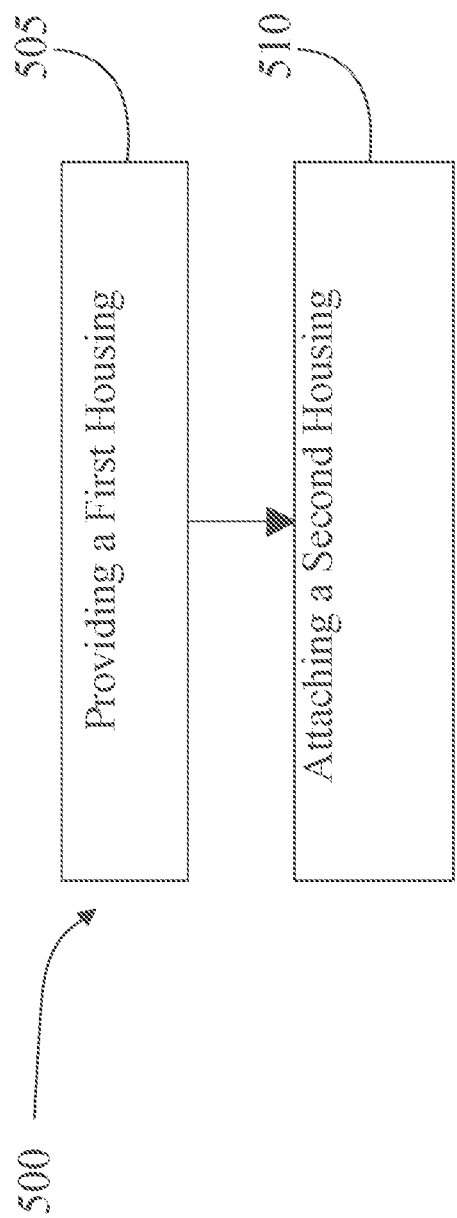
FIG. 5 is a flow diagram illustrating an exemplary embodiment of a method of manufacturing a recycled two cell container device.

Referring now to FIG. 5, an exemplary embodiment of a method 500 of manufacturing a recycled two cell container device is illustrated. At step 505 a first housing 104 is provided. First housing 104 is composed of recycled material and configured to house a liquid the first housing 104 including an upper end 108 the upper end containing at least a covering, a body and a lower end, the lower end located opposite to the upper end 108. In an embodiment, providing a first housing 104 may include recycling material that will be used to produce device 100, first housing 104, and/or second housing 124. Recycling may include melting materials such as glass or plastic to then be molded into device 100, first housing 104, and/or second housing 124. Melting materials to reuse them to produce device 100, first housing 104, and/or second housing 124 may include removing all labels that may be present such as labels on water bottles. Materials may then be broken down into smaller pieces such as by cutting or making them into a smaller size. Materials may then be melted to a specific temperature until melted, such as for example between 250-300 degrees Fahrenheit for certain plastics. The melted materials may then be placed into a mold designed to be of shape of device 100, first housing 104, and/or second housing 124. In an embodiment, device 100, first housing 104, and/or second housing 124 may be manufactured by blow molding and utilizing a heat-sealing mechanism.

With continued reference to FIG. 5, at step 510 a second housing 124 is attached to the first housing 104. The second housing 124 is composed of recycled material and configured to house at least a pill and includes a first side the first side including at least a covering and a second side located opposite to the first side. In an embodiment, attaching second housing 124 may include recycling materials that will be used to produce second housing 124. In an embodiment, second housing 124 may be attached to first housing 104 by blow molding. Blow molding may include melting down recycled materials and forming a parison and/or a preform. In such an instance, a parison and/or a preform may then be clamped into a mold and air may be blown into it. Air blown into the parison and/or preform may then push the recycled material such as plastic, out to match the mold. The material may then be cooled and hardened. The mold may then be opened and device 100 may be ejected from the mold. In an embodiment, blow molding may include extrusion blow molding, spin trimming, injection blow molding, and/or injection stretch blow molding processes. Extrusion blow molding may include melting a recycled material such as plastic and extruding plastic into a hollow tube to form a parison. The parison may then be captured by closing it into a cooled metal mold. Air may then be blown into the parison to filate it into the shape of first housing 104, second housing 124, and/or device 100. After the plastic has cooled the mold may then be opened and first housing 104, second housing 124, and/or device 100 may then be ejected. Extrusion blow molding may include continuous extrusion blow molding where the parison may be extruded continuously and the individual parts may be cut off by a knife. Extrusion blow molding may include intermittent blow molding where screw turns may stop and push the melt out such as by a metal rod. In an embodiment, excess material produced during molding process may be removed such as by spin trimming to use a knife or sharp edge to cut excess material away. In an embodiment, device 100, first housing 104, and/or second housing 124 may be manufactured and/or attached by injection blow molding. Injection blow molding may include injecting a polymer of melted recycled materials such as plastic and/or glass into a mold located on a core pin. The core pin may then be rotated to a blow molding station to be inflated and cooled. The polymer may be initially melted by an extruder barrel and screw assembly when may then be fed into a hot runner manifold whereby it is injected through a nozzle into a heated cavity and core pin. The cavity mold may then form the external shape and may be clamped around a core rod which forms the internal shape of the preform. The preform may consist of a fully formed first housing 104, second housing 124, and/or device 100. The preform mold may be opened and the core rod may be rotated and clamped into a hollow chilled blow mold. The end of the core rod may open and allow compressed air into the preform which may inflate it to the finished shape of first housing 104, second housing 124, and/or device 100. After cooling the blow mold may be opened and the core rod may be rotated to the ejection position. The finished first housing 104, second housing 124, and/or device 100 may be stripped off the core rod and may be leak-tested prior to packing. In an embodiment, device 100, first housing 104, and/or second housing 124 may be manufactured and/or attached by injection stretch blow molding. In such an instance, stretch blow molding may include molding recycled material such as plastic into a preform using injection molding process. The preform may then be packaged and fed later after cooling into a reheat stretch blow molding machine. In such an instance, the preform may be heated above melting point of the recycled material then blown using high-pressure air into a mold of first housing 104, second housing 124, and/or device 100. In an embodiment, the preform may be stretched with a core rod. Injection stretch blow molding may include single stage and/or two stage processes. Injection stretch blow molding may include 3-station and/or 4-station machines.

Figure 6A:
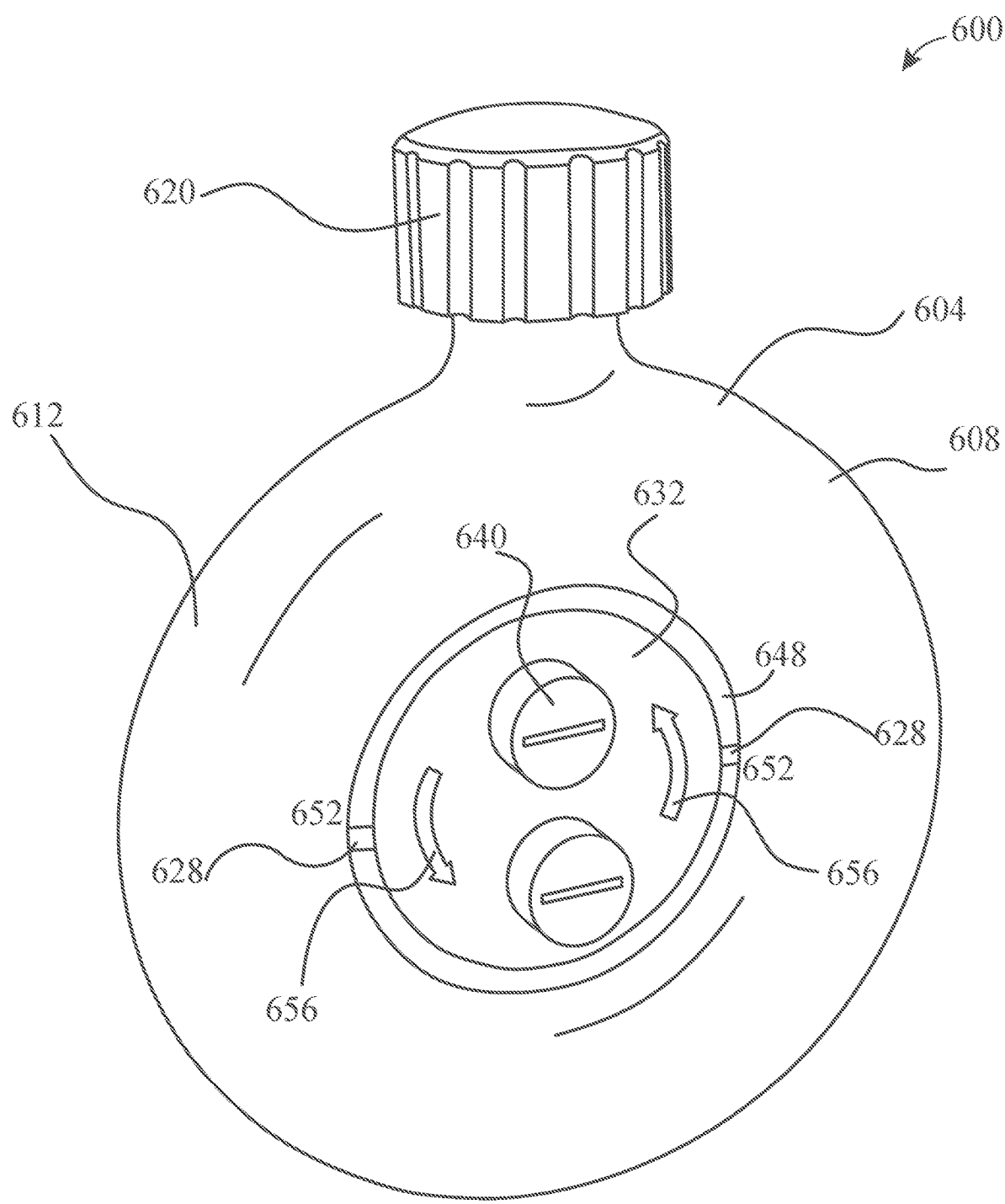
FIGS. 6A-B are schematic diagrams illustrating exemplary embodiments of a two-cell container device.

Referring now to FIG. 6A, an exemplary embodiment 600 of a two cell container device is illustrated. Two cell container device 600 may include any two-cell receptacle 100 as described above. Two cell container device includes a first housing 604. First housing 604 may be constructed of any material or combination of materials suitable for construction of first housing 604 as described above. First housing 604 may be constructed and/or manufactured using any process and/or processes for manufacture of first housing 604 and/or any other portion of device 100 as described above. First housing 604 may be configured to house a liquid, which may be any liquid as described in this disclosure.

Still referring to FIG. 6A, first housing 604, 604 includes a body 608. Body 608 may be constructed of any material or combination of materials, and using any construction technique, suitable for construction of any element of embodiments described in this disclosure. In an embodiment, body 608 includes an annular form, where "annular form" is defined as any ring-shaped form, including without limitation a toroidal form. Ring-shaped forms may include a toroidal form that may be generated by rotating any polygonal, curved, or other shape about an axis of symmetry, which may be defined in the conventional sense of an axis of symmetry of a toroid, as an axis about which a given geometric form may be rotated to form the toroid, such that the axis of symmetry passes through a through-hole 616 in the ring thus formed, orthogonally to the plane of rotation of the geometry. A geometric form rotated to form toroid may include a circle, square, rectangle, or any other exemplary form that may occur to a person skilled in the art upon reviewing the entirety of this disclosure. Body 608 includes an interior reservoir 612 for liquid, where interior reservoir 612 may be in the interior of the toroid; that is, where the toroid is formed by rotating a two-dimensional shape about axis of symmetry, reservoir 612 may be in an interior hollow formed between surfaces defined by rotation about axis of symmetry of a perimeter of the two-dimensional shape. In other words, reservoir 612 may be in an interior space analogous to the interior space of a tire or inner tube that is filled with pressurized air. Body 608 includes a through-hole 616, which may be referred to as the axial through-hole 616 of a toroidal shape or a central through-hole 616 of an annular form or ring. Body 608 includes a mouth portion 620, which may provide an access to reservoir 612 via an aperture. Mouth portion 620 may be closed, sealed, and/or capped by a threaded cap, a film, and/or any other form of closure described above, including adhered and/or heat-sealed films or flexible surfaces. Mouth portion 620 may include a lanyard and/or clip for attachment of device to a belt, belt-loop, or other item. Reservoir 612 may be refillable. Annular form of body 608 may deviate from a strict toroid by inclusion of mouth portion 620; furthermore, although a complete rotational form may be depicted herein, a partial ring or "hook" shape, as formed by a partial rotation with an enclosed end, is also contemplated as within the definition of an annular form. Furthermore, rotation may be elliptical and/or may describe any other curved and/or polygonal form, such that through-hole 616 may have, for instance, a circular, elliptical, square, star-shaped, or other cross-sectional shape; cross-sectional shape may vary at different points of through-hole 616, changing from one shape and/or size to another, for instance.

Figure 6B:
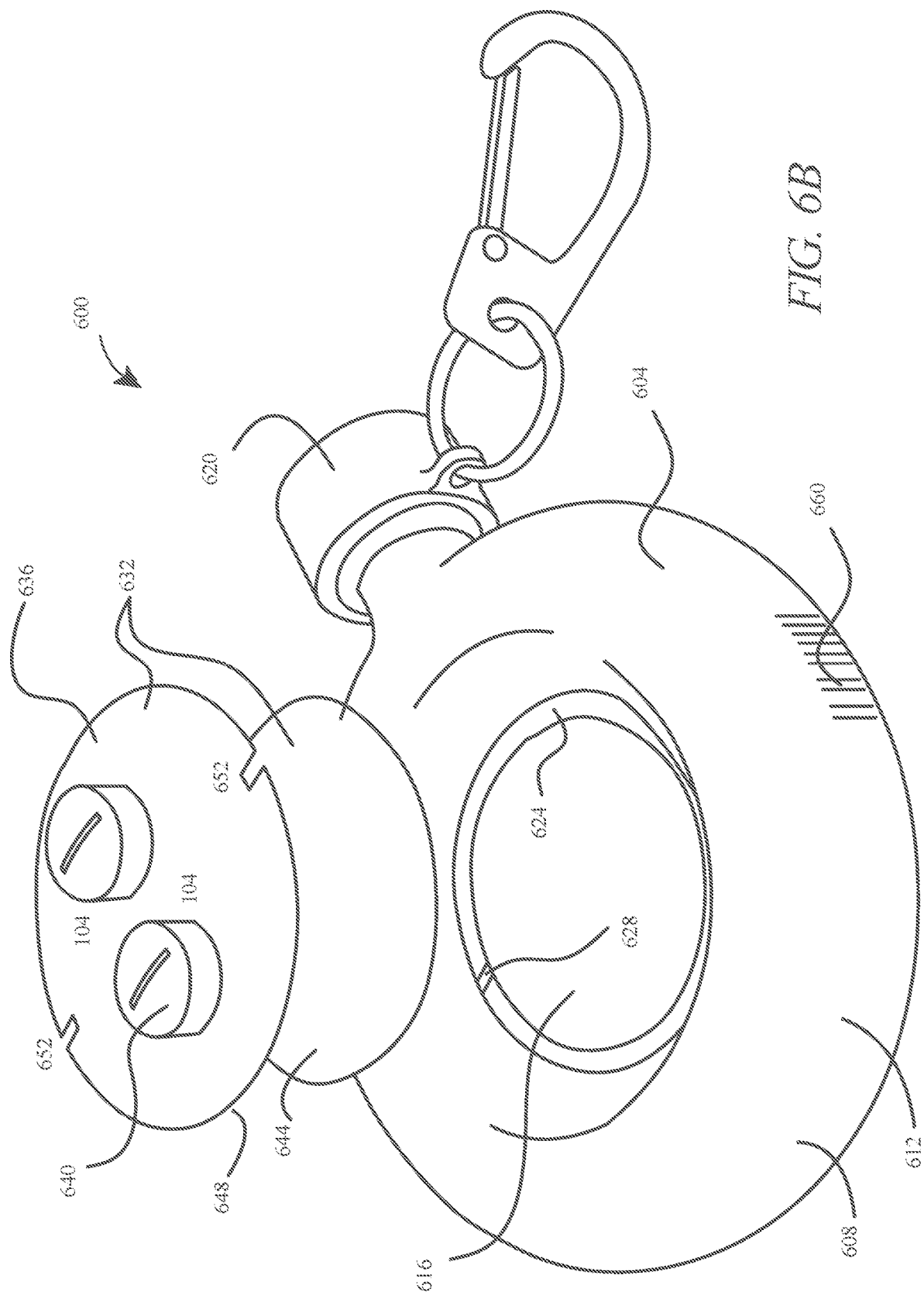

Referring now to FIG. 6B, an exploded view of an embodiment of device 600 is illustrated for exemplary purposes. Body 608 and/or through-hole 616 may include a shelf 624 projecting from the body 608 into the through-hole 616. Shelf 624 may describe an annular structure in a plane axially bisecting the body 608, where "axially" signifies axially with regard to axis of rotation. Shelf 624 may be substantially orthogonal to axis of symmetry of the body 608. In an embodiment, shelf 624 may include at least a protrusion 628 extending axially from the shelf 624; at least a protrusion 628 may include two protrusions opposite each other across through-hole 616. At least a protrusion 628 may be substantially ridged-shaped, but may, for instance, be flanged, or otherwise bearing projections in a plane of rotation of toroidal shape, at a distal end, where a proximal end is attached and/or fused to shelf 624; flange and/or projections may act to retain a gap 652 inserted over at least a protrusion 628 by "snapping" the latter into position, acting to prevent its accidental removal.

Still referring to FIG. 6B, device may include a second housing 632, the second housing 632 secured within the through-hole 616. Second housing 632 is configured to house at least a pill, for instance as described and/or defined above. Second housing 632 includes a first side 636 including at least a pill receptacle 640 having an opening; this may be implemented in any way described and/or disclosed above. For instance, pill receptacle 640 may include a blister, a groove, a chamber with an open side, or the like. In an embodiment, second housing 632 is configured to house a dose of a liquid medication, including any medication as described herein. For example, second housing 632 may contain a dose of liquid acetaminophen or liquid diphenhydramine. In an embodiment, second housing 632 may be configured to house various doses of various liquid medications intended for various age groups. For example, second housing 632 may be configured to contain a first dose of liquid acetaminophen intended for newborn babies, or second housing may be configured to contain a second dose of liquid acetaminophen intended for toddlers, or second housing may be configured to contain a third dose of liquid acetaminophen intended for adults. Second housing 632 includes a second side 644 adhered to the first side 636; the second side 644 covers the opening. Second side 644 may include any material suitable for covering a pill receptacle 640 as described above, including a flexible backing, which may be a mylar sheet or the like. Second side 644 may be adhered to first side 636 using any suitable adhesive and/or heat-sealing or like processes. Each of first side 636 and/or second side 644 may be reusable and/or disposable.

With continued reference to FIG. 6B, second housing 632 may be formed to fit within through-hole 616. For instance, all or part of shape of second housing 632 may match a cross-sectional shape of through-hole 616; second housing 632 may fit snugly in through-hole 616, for instance at location of shelf 624. Second housing 632 may have, without limitation, a circular shape, rectangular shape, or any other suitable shape. Second housing 632 may fit against shelf 624 when inserted in through-hole 616. First side 636 may include a rim portion 648 projecting beyond the second side 644, rim portion 648 contacting the shelf 624; rim portion 648 may be annular or substantially annular in shape, forming a ring-shaped surface that fits against shelf 624. Second housing 632 may include at least a gap 652 fitting over at least a protrusion 628; gap 652 may be formed to fit snugly and/or snap over at least a protrusion 628 to aid in securing second housing 632 in through-hole 616. Second housing 632 may be secured in the through hole by snapping the at least a gap 652 over the at least a protrusion 628. Second housing 632 may be secured in the through-hole 616 by adhesion of the second housing 632 and/or rim portion 648 to the shelf 624. Adhesion may be accomplished using any suitable adhesive, such as without limitation a press-adhesive, gel adhesive, or the like. Second housing 632 may alternatively be secured against shelf 624 using heat-sealing. Second housing 632 may be secured against shelf 624 using a press fastener. As used herein, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minn. Press-fastener may also include adhesives, including reusable gel adhesives, GECKSKIN adhesives developed by the University of Massachusetts in Amherst, of Amherst, Mass., or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. Second housing 632 may include at least a press-tab 656 for securing the second housing 632 in the through-hole 616. Press-tab 656 may include a locus where a user may exert pressure on an upper surface of second housing 604 to attach second housing to first housing. Body 608 may include a grip 660 which may be knurled, ribbed, or otherwise textured and/or formed to increase apparent coefficient of static friction and/or to inform user of an optimal locus at which to hold body 608 while attaching and/or detaching second housing 632 to access pills.

Figure 7:
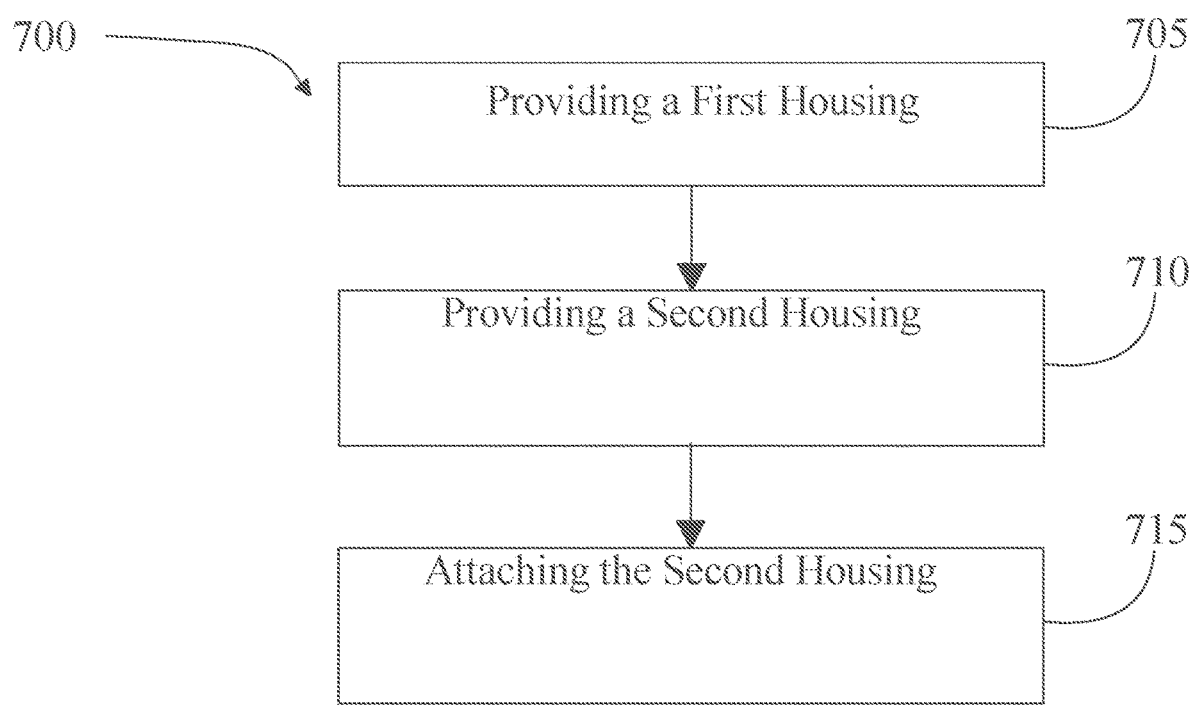
FIG. 7 is a flow diagram illustrating an exemplary embodiment of a method of manufacturing a recycled two cell container device.

Referring to FIG. 7, an exemplary method 700 of manufacturing a two-cell container device is disclosed. At step 705, method includes providing a first housing 604, the first housing 604 configured to house a liquid, the first housing 604 including a body 608, wherein the body 608 further comprises an annular form with an interior reservoir 612 for the liquid and a central through-hole 616, and a mouth portion 620 providing access to the interior receptacle; this may be accomplished without limitation as described above in reference to FIGS. 1-6B. At step 710, method 700 includes providing a second housing 632 configured to house at least a pill; this may be accomplished without limitation as described above in reference to FIGS. 1-6B. Second housing 632 includes a first side 636 including at least a pill receptacle 640 having an opening and a second side 644 adhered to the first side 636, wherein the second side 644 covers the opening. At step 715, method 700 includes securing the second housing 632 within the through-hole 616. This maybe accomplished without limitation as described above in reference to FIGS. 1-6B. A user may detach second housing and/or remove second side 644 to access pills contained in pill receptacle 640 or receptacles; user may then open mouth portion 620 to access liquid so as to swallow pills, for instance and without limitation as described above.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and device according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A two-cell container device, the device comprising:
   a first housing configured to house a liquid, the first housing comprising:
   a body, wherein the body further comprises an annular form comprising a toroidal form containing an interior refillable reservoir for the liquid and a central through-hole; and
   a mouth portion containing a cap, wherein the mouth portion provides_access to the interior refillable reservoir; and
   a second housing, the second housing secured within the through-hole, the second housing configured to house at least a pill, wherein the second housing comprises
   a first side including at least a pill receptacle having an opening; and
   a second side adhered to the first side, wherein the second side covers the opening.

2. The device of claim 1, wherein the through hole further comprises a shelf projecting from the body into the through-hole.

3. The device of claim 2, wherein the shelf describes an annular structure in a plane axially bisecting the body.

4. The device of claim 2, wherein the shelf is substantially orthogonal to an axis of symmetry of the body.

5. The device of claim 2, wherein the first side further comprises a rim portion projecting beyond the second side, the rim portion contacting the shelf.

6. The device of claim 2, wherein the second housing is secured in the through-hole by adhesion of the second housing to the shelf.

7. The device of claim 6, where the adhesion is accomplished using a press-adhesive.

8. The device of claim 2, wherein the shelf includes at least a protrusion extending axially from the shelf.

9. The device of claim 8, wherein the second housing further comprises at least a gap fitting over the at least a protrusion.

10. The device of claim 9, wherein the second housing is secured in the through hole by snapping the at least a gap over the at least a protrusion.

11. The device of claim 1, wherein the second housing includes at least a press-tab for securing the second housing in the through-hole.

12. The device of claim 1, wherein the at least a pill receptacle includes at least a blister.

13. The device of claim 1, wherein the second side further comprises a disposable backing adhered to the first side.

14. The device of claim 1, wherein the second side further comprises a reusable backing adhered to the first side.

15. The device of claim 1, wherein the second housing is of a circular shape.

16. The device of claim 1, wherein the first housing is composed of recycled material.

17. The device of claim 1, wherein the second housing is composed of recycled material.

18. A method of manufacturing a recycled two cell container device the method comprising:
   providing a first housing, the first housing configured to house a liquid, the first housing comprising:
   a body, wherein the body further comprises an annular form comprising a toroidal form containing an interior refillable reservoir for the liquid and a central through-hole; and
   a mouth portion containing a cap, providing access to the interior refillable reservoir;
   providing a second housing configured to house at least a pill, wherein the second housing comprises:
   a first side including at least a pill receptacle having an opening; and
   a second side adhered to the first side, wherein the second side covers the opening; and
   securing the second housing within the through-hole.

* * * * *